May 15, 1928.

J. S. REYNOLDS

UNIVERSAL PIPE JOINT

Filed April 30, 1925

1,669,949

INVENTOR.
Joy S. Reynolds
BY
Charles E. Wisner
ATTORNEY.

Patented May 15, 1928.

1,669,949

UNITED STATES PATENT OFFICE.

JOY S. REYNOLDS, OF DETROIT, MICHIGAN.

UNIVERSAL PIPE JOINT.

Application filed April 30, 1925. Serial No. 26,868.

This invention relates to universal pipe joints, and the purpose of the invention is to secure a fitting for connecting sections of solid pipe capable of limited movement without undue strain on the pipe and in which leakage is prevented.

A feature of the invention is in the provision of a universal pipe joint carrying liquids under pressure so constructed that the pressure of the liquid tends to prevent leakage. The fitting is adaptable for use with solid pipe for transferring liquids under pressure and therefore is particularly adaptable for use in the pipe for hydraulic braking systems of automotive vehicles in which the fluid is to be transmitted to brakes on the steering wheels which is adapted to be turned to various positions and is also adapted for use in other positions between the body of the pipe carried on the chassis and the pipe sections leading to a brake element to compensate for movement of the chassis relative to wheel and axle. By use of a joint of the character herein described the usual flexible armored tubing may be dispensed with and solid tubing provided with joints at different points may be utilized. The several objects and novel features of the invention are hereinafter more fully described and claimed, and the preferred form of construction of a pipe fitting embodying my invention is shown in the accompanying drawings in which—

Figure 1:
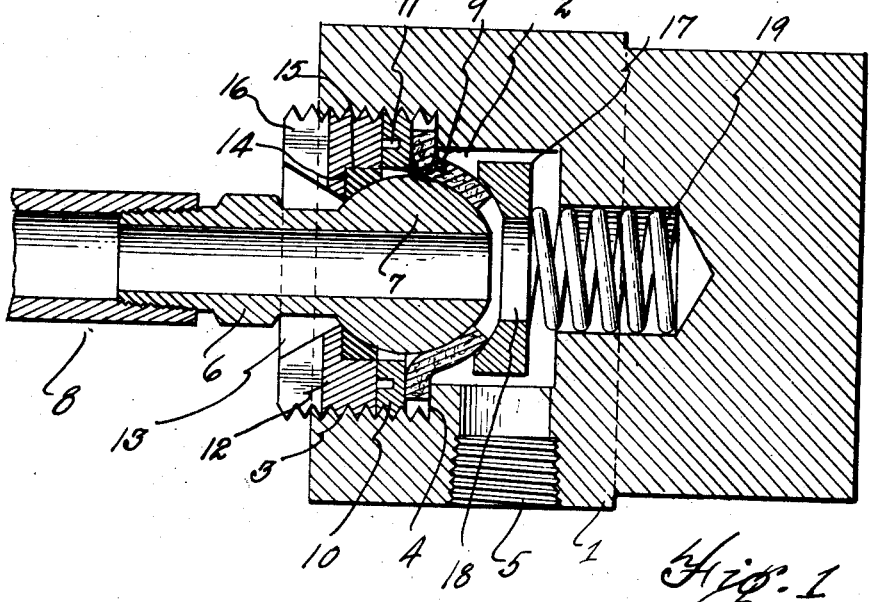
Fig. 1 is a central longitudinal section of my improved pipe fitting.
Figure 2:
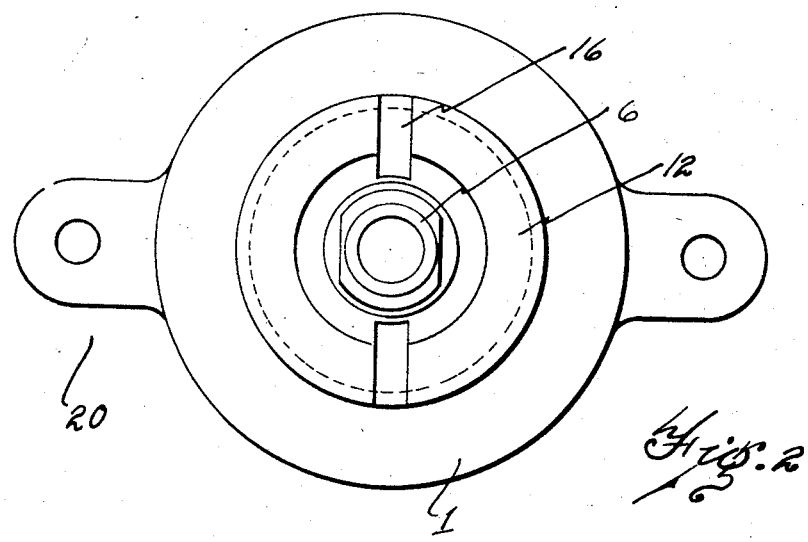
Fig. 2 is an elevation thereof taken from the left side of Fig. 1.

In its preferred form the device consists of a block or base 1 having a central recess or socket 2 opening through one side thereof and provided with a threaded counterbore 3 forming an annular shoulder 4 intermediate the face and bottom of the recess. This block or base between the annular shoulder and the bottom of the recess has a threaded aperture 5 for the attachment of a pipe thereto. In this recess 2 is a tubular member 6 having a ball portion 7 at the inner end and the outer end of which is threaded to receive a pipe 8. This ball portion 7 at the inner end engages a centrally apertured and cupped leather packing member 9, the peripheral edge of which rests on the annular shoulder 4 and is secured thereon by the threaded retainer 10 which has a central aperture slightly greater in diameter than the ball 7. The aperture in the packing member 9 is materially less in diameter than that of the ball and preferably slightly greater in diameter than the central aperture through the member 6. The retainer 10 is preferably provided with a series of recesses 11 in the outer face permitting the use of a spanner wrench for threading the same into the threaded bore 3. To hold the tubular member 6 in position I have provided an externally threaded retainer 12. This retainer 12, which I will hereinafter term the ball retainer, has a cone shaped opening 13 in the forward face and is counterbored in the opposite side providing a recess 14 in which is positioned a soft metal filler 15 providing a seat for the ball portion 7 of the member 6. The size of the aperture at the bottom of the cone portion and of the recess 14 is but slightly greater in diameter than that of the member 6 adjacent the ball. The ball retainer 12 is threaded into the recess and engages the packing retainer 10 and acts as a lock nut to prevent release of the retainer 10 and also holds the ball from movement to the left of the position shown in Fig. 1. This ball retainer 12 has cross slots 16 in the outer end for introduction of an instrument to turn the same into or out of the block 1 and the tapered form of the opening 13 permits the member 6 and pipe line 8 to swing relative to the block to a limited extent and in any direction. The metal seat 15 for the ball 7 is of metal softer than the ball causing the wear to be taken by the seat. This ball at the forward end engages the packing 9 cupping the same as shown. This packing is preferably made of leather but may be of any suitable flexible material and, to hold the packing member in engagement with the ball at the forward end, I provide the cupped metal washer 17 which has a central aperture 18 and is held in engagement with the packing member at the aperture therein by a spring 19. The cupped face of the washer 17 under the action of the spring tends to force the flexible packing member 9 to close contact with the ball end so that leakage around the ball is prevented. The aperture 18 in the cupped washer 17 permits fluid to pass from the tubular member 6 into the recess 2 and thence to the member 5 or in the reverse direction. The spring pressed washer 17 insures a non-leakable joint and when used with fluid under pressure, the pressure also tends to hold the packing member or washer 9 in contact with the ball.

A feature of this invention and one of the objects thereof is to provide a fitting containing a packing and permitting removal of the ball member without disturbing the packing member. This is accomplished by use of the packing retainer 10 separate from the ball retainer 12, the retainer 10 having a central opening greater in diameter than the ball so that by removal of the retainer 12, the ball 7 and tube 6 may be taken from the recess and the packing member remain therein in position to be again engaged by the ball upon its reintroduction.

The block 1 is intended to be stationarily mounted and for this purpose may be provided with apertured ears 20 on opposite sides thereof to secure the same in position. The form of this block or base, however, is unimportant and it is also unimportant as to whether or not the same be stationarily mounted inasmuch as the piping connected with the aperture 5 will support the block. The position of the threaded aperture 5 for the pipe line also is not material, it being possible to place the same in any desired or adaptable relationship or angle with the central bore 2.

From the foregoing description it is evident that the improved fitting is simple in form and comparatively inexpensive in construction; is readily assembled or disassembled without disturbing the packing member by means of which leakage is prevented and by provision of the cupped washer, a means is incorporated to maintain the washer in a packing relation with the ball irrespective as to whether the fluid in the pipe line is under pressure or otherwise.

Having thus briefly described my invention, what I claim is—

1. A universal pipe joint comprising a block having a recess provided with an annular shoulder intermediate its length and being threaded from the surface to adjacent the shoulder, a tubular member extending thereinto and having a ball like portion at the inner end within the recess, a leather packing member of disk like form having the periphery thereof engaging the shoulder, a retainer consisting of an externally threaded and centrally apertured nut for securing the periphery of the packing disk against the shoulder, a retainer for the tubular member consisting of a nut threaded in the recess and having on the inner face a soft metal seat engaging the ball end, said nut having a tapered aperture through which the body of the tubular member extends, the said retainer holding the ball against the packing disk cupping the disk and causing the same to engage the surface of the ball, a spring pressed member engaging the surface of the packing disk at the central aperture, said recess having an aperture between the said shoulder and the bottom thereof for the attachment of a pipe.

2. A pipe joint for connecting one pipe to another to permit relative universal movement therebetween comprising a centrally apertured ball with which one pipe is connected, a recessed socket member having an aperture at an angle to the recess with which another pipe may be connected, the ball portion of the ball member being positioned in the recess of the socket, the said recess having a counterbored threaded portion providing a shoulder, a centrally apertured washer like packing member having the periphery thereof lying over the shoulder, a threaded ring having a central aperture greater in diameter than the diameter of the ball for retaining the packing against the said shoulder, a centrally apertured nut threaded for engagement with the threaded portion of the socket and formed with an aperture permitting the pipe to be inserted therethrough and shaped to provide a seat for the ball end, the nut being adjustable to vary the position of the ball end relative to the packing disk, a cupped washer having a central aperture greater in diameter than the diameter of the said ball and engaging over the periphery of the cupped packing member to hold the packing in engagement with the ball surface, and a spring for forcing the washer into engagement with the packing.

3. A universal pipe joint for connecting one pipe to another to permit relative universal movement therebetween comprising a centrally apertured ball with which one pipe is connected, a recessed socket member having an aperture with which another pipe may be connected, a retainer for holding the ball portion in the recess and having a central aperture through which the pipe extends and a seat for the ball end adjacent the point of connection with the pipe, the retainer being adjustable in the recess to vary the position of the ball, a flexible packing member having a central aperture, the recess having a shoulder on which the periphery of the packing member rests, a ring member adjustable in the recess to engage the packing member and having a central aperture greater in diameter than the ball, the construction permitting removal of the ball end and retaining nut without removal of the packing member, and means for holding the packing member in contact with the ball surface.

In testimony whereof, I sign this specification.

JOY S. REYNOLDS.